United States Patent
Hobohm et al.

(10) Patent No.: US 9,085,034 B2
(45) Date of Patent: Jul. 21, 2015

(54) METHOD FOR MILLING A BLANK IN THE PRODUCTION OF A TURBINE BLADE

(75) Inventors: Uwe Hobohm, Wendelstein (DE);
Mario Stromeyer, Furth (DE); Werner Bruno Penkert, Schwanstetten (DE)

(73) Assignee: KENNAMETAL INC, Latrobe, PA (US)

( * ) Notice: Subject to any disclaimer, the term of this patent is extended or adjusted under 35 U.S.C. 154(b) by 423 days.

(21) Appl. No.: 13/591,439

(22) Filed: Aug. 22, 2012

(65) Prior Publication Data
US 2013/0051949 A1 Feb. 28, 2013

(30) Foreign Application Priority Data
Aug. 22, 2011 (DE) .......................... 10 2011 110 779

(51) Int. Cl.
*B23C 3/18* (2006.01)

(52) U.S. Cl.
CPC .............. *B23C 3/18* (2013.01); *B23C 2215/44* (2013.01); *Y10T 409/303808* (2015.01); *Y10T 409/307616* (2015.01)

(58) Field of Classification Search
CPC B23C 3/18; B23C 2215/04; B23C 2215/045; B23C 2215/44; Y10T 409/303752; Y10T 409/303808; Y10T 409/306776; Y10T 409/307056; Y10T 409/307112; Y10T 409/307616; Y10T 409/30784; Y10T 409/309352
USPC ......... 409/131, 132, 185, 190, 191, 200, 204, 409/231
See application file for complete search history.

(56) References Cited

U.S. PATENT DOCUMENTS

| | | | | |
|---|---|---|---|---|
| 2,915,949 A | * | 12/1959 | Novkov | 409/200 |
| 2,960,013 A | * | 11/1960 | Novkov | 409/200 |
| 3,533,195 A | * | 10/1970 | Schumann et al. | 451/440 |
| 4,031,809 A | * | 6/1977 | Shraiman et al. | 409/84 |
| 5,727,296 A | * | 3/1998 | Kobler | 29/27 C |
| 5,964,016 A | * | 10/1999 | Ito et al. | 29/27 C |
| 7,261,500 B2 | * | 8/2007 | Killer et al. | 409/132 |
| 2003/0202854 A1 | | 10/2003 | Lebkuechner | |
| 2006/0140734 A1 | | 6/2006 | Glaesser | |
| 2007/0127996 A1 | | 6/2007 | Heinrich et al. | |

FOREIGN PATENT DOCUMENTS

| | | |
|---|---|---|
| CH | 702 705 B1 | 8/2011 |
| CN | 101966604 A | 2/2011 |
| DE | 10 2010 026 784 A1 | 1/2012 |
| EP | 1 034 865 A1 | 9/2000 |
| EP | 1 356 886 A1 | 10/2003 |

(Continued)

OTHER PUBLICATIONS

Pro Quest machine translation of JP 11-114759, printed Dec. 2014.*

*Primary Examiner* — Daniel Howell
(74) *Attorney, Agent, or Firm* — Larry R. Meenan

(57) ABSTRACT

A method for milling a blank in the production of a turbine blade which in the final state has at least one blade root for fastening to a carrier and also an adjoining blade body extending in the longitudinal direction includes clamping the blank on its root side in a mount and machining the blank with a milling cutter. Machining the blank includes moving the milling cutter in an advancing direction for roughing machining while superimposing a circular movement as per a trochoidal milling method.

15 Claims, 2 Drawing Sheets

(56) References Cited

FOREIGN PATENT DOCUMENTS

| | | | | |
|---|---|---|---|---|
| FR | 2481169 | A | * | 10/1981 |
| JP | 06206112 | A | * | 7/1994 |
| JP | 06297222 | A | * | 10/1994 |
| JP | 11114759 | A | * | 4/1999 |
| JP | 2000141120 | A | * | 5/2000 |
| WO | 2004/113000 | A2 | | 12/2004 |

* cited by examiner

METHOD FOR MILLING A BLANK IN THE PRODUCTION OF A TURBINE BLADE

BACKGROUND

1. Field of the Invention

The invention relates to a method for milling a blank in the production of a turbine blade which in the final state has at least one blade root for fastening to a carrier and also a blade body adjoining the blade root and extending in the longitudinal direction.

2. Background Information

Owing to the high thermal and mechanical loading which they must withstand, turbine blades consist of so-called superalloys. These are generally characterized by a very high strength, for example of >1000 N/mm$^2$, and a high temperature resistance. Tools, in particular milling tools for machining such superalloys, are therefore usually subject to a high degree of wear. Moreover, the machining rate is substantially reduced by comparison with softer steels.

To produce such turbine blades, which have a blade root for hooking into a carrier, a monolithic blank, that is to say a workpiece block which usually has an approximately parallelepipedal shape, is subjected to a milling operation.

The blade body of the turbine blade usually has, when viewed in cross section, an approximately aerofoil-like contour. EP 1 034 865 A1 discloses a milling method for machining a blank in which the milling cutter is guided in an approximately spiral shape around the blank and thus removes the successive material until the desired final contour is achieved. The machining time in this method is comparatively high.

Hence there is room for improvement in methods for machining turbine blades.

SUMMARY OF THE INVENTION

One of the many objects of the present invention is to provide an improved method for milling a blank to produce a turbine blade, in particular a turbine blade consisting of a superalloy. This is achieved according to the invention by a method having the features of Claim 1. The method serves to produce a turbine blade from a one-piece, monolithic blank, wherein the turbine blade has at least one blade root and also an adjoining blade body extending in the longitudinal direction. Here, the blank is clamped into a mount on its root side, that is to say at the blade root, and then machined with the aid of a milling cutter. Provision is made here for the milling cutter to be moved in an advancing direction for roughing machining and for a circular movement as per a trochoidal milling method to be superimposed on this advancing movement.

An essential aspect can therefore be seen in the present case in that, with such a blank, roughing machining is carried out by means of a trochoidal milling method to produce a turbine blade.

In the trochoidal method, a circular movement is generally superimposed on an advancing movement. The advantage of trochoidal milling can be seen in the fact that the milling cutter is only loaded to a minor degree, something which is particularly advantageous when machining superalloys. In the method described here of producing turbine blades from a monolithic blank, the latter is usually clamped at its opposite end faces using a suitable mounting device. However, the surfaces available for clamping are very small, which means that only small retaining forces can be exerted. Particularly in the case of large turbine blades having a length >50 cm up to a length of 200 cm, the problem arises that high forces are exerted during a conventional milling method. Loading is kept low by the trochoidal method.

The tool wear is also considerably lower by comparison with conventional milling methods. As a result, the service life of the milling tools is finally also considerably increased.

In a particularly expedient refinement, provision is made for the blank to be machined with the aid of the trochoidal milling method in the region of the blade body. Precisely for the machining of the blank in the region of the blade body, that is to say far apart from the mounts arranged on the end faces, trochoidal milling here has a decisive advantage by virtue of its merely small loading.

Provision is preferably made here for the advancing direction of the milling cutter to be the longitudinal direction; the milling cutter is therefore, starting from the blade root, guided in the longitudinal direction of the blade body along the latter.

The trochoidal milling method is used particularly in the case of large turbine blades. Here, by comparison with conventional milling methods for turbine blades, considerable time and hence cost savings can be achieved.

In an expedient manner, the entire material removal during roughing machining preferably takes place in only one working step, i.e. with a single movement of the milling cutter over the site to be machined. It is therefore—unlike with conventional milling methods—not required to move the milling cutter multiple times over the site to be machined in order to achieve the desired material removal. In the method of trochoidal milling described here, the so-called axial cutting depth, that is to say the depth by which the milling cutter penetrates into the workpiece in the direction of its milling cutter longitudinal axis, therefore corresponds to the desired material removal, that is to say the material depth to be removed.

In order to achieve minimum tool wear, provision is further preferably made here for this axial cutting depth to correspond to a large part of a cutting edge length of a cutting edge of the milling cutter. By this is meant that the milling cutter is engaged, for example at least with 70%-80% of its cutting edge length, with the workpiece (blank). This results overall in the entire cutting edge being uniformly loaded and hence also uniformly worn. By contrast with conventional milling methods in which, particularly during the machining of superalloys, the respective milling cutter is engaged only with a fraction of its cutting edge length with the workpiece, the overall result is that a considerably reduced tool wear is achieved.

The axial cutting depth here is preferably >4 mm and is for example in the region of 5 mm.

With a view to achieving as speedy a machining method as possible, provision is further made for the diameter of the circular movement during the trochoidal milling to correspond to the width of the blank. The milling cutter therefore passes only once in the advancing direction over the whole side of the blank, and therefore no reversal of the milling cutter is required to produce a plurality of milling paths arranged next to one another.

For this purpose, the milling cutter preferably has a diameter in the range of 40% to 70% of the width to be machined of the blank.

For machining in the region of the blade body, a face milling cutter equipped with indexable cutting inserts is used in an expedient embodiment. By this is meant a milling cutter which typically has an approximately cylindrical milling head on whose front circumferential side there are arranged exchangeable cutting inserts, in particular indexable cutting inserts, which project beyond a carrier both on the peripheral side and on the end side.

The machining of the blank in the region of the blade body with this face milling cutter is mere roughing machining in which the aerofoil cross-sectional shape characteristic of the turbine blades has not yet been machined out. For this final contour machining, use is expediently made of a supplementary milling method for example the milling method described in EP 1 034 865 A1. The combination of the roughing method by means of trochoidal milling with the second contour milling method results overall in a very efficient and time-saving machining method for producing a turbine blade from a superalloy.

The entire machining method of the blank right up to the turbine blade preferably takes place without any reclamping or unclamping of the workpiece. The different milling methods are therefore carried out by means of a single machining machine, there taking place at most an exchange of the tool and a different control for the milling cutter.

In addition to the machining of the blade body with the aid of the trochoidal milling method, the blade root is also machined with such a milling method in order to mill so-called retaining grooves into the root. Here too the entire retaining groove is preferably milled in only one method step, i.e. the groove depth to be milled corresponds to the axial cutting depth of the milling cutter and the groove width corresponds to the diameter of the circular movement during trochoidal milling.

For groove machining, use is expediently made here of a so-called end milling cutter which has, in its front region for example also spirally running cutting edges which are preferably machined from a solid material blank.

For this purpose, use is particularly made of a conventional end milling cutter with positive cutting edge geometry. By positive cutting edge geometry is meant a tapering cutting edge. The cutting edge is thus formed at an acute angle by contrast with a so-called negative cutting edge geometry, in which the cutting edge is formed at an obtuse angle, that is to say at an angle >90°. With such negative cutting edge geometries, no cutting but rather a so-called scraping is made possible.

BRIEF DESCRIPTION OF THE DRAWINGS

An exemplary embodiment of the invention will be explained in more detail below with reference to the figures. In these figures, which are each represented schematically and in greatly simplified form.

In the figures, equivalent parts are provided with the same reference signs.

DESCRIPTION OF AN EXEMPLARY
EMBODIMENT

Figure 1:
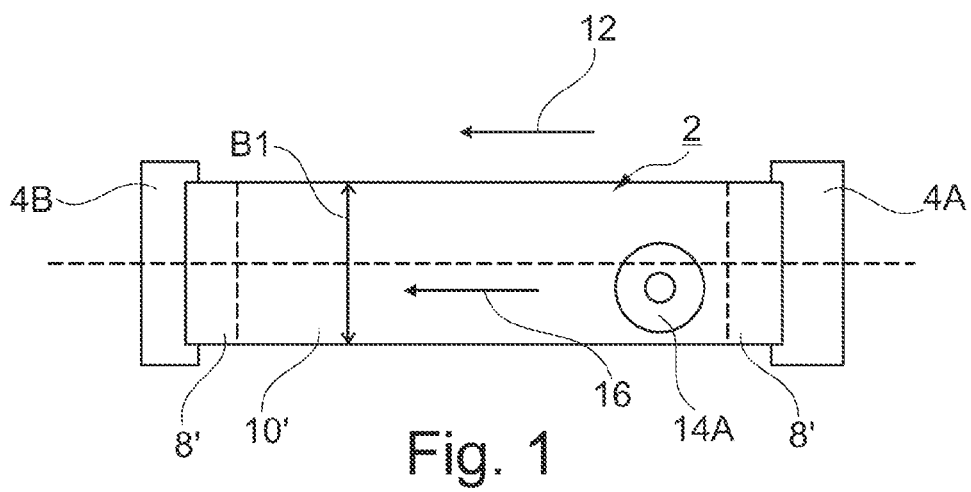
FIG. 1 shows a plan view of a clamped-in blank, with face milling cutter indicated.
Figure 4:
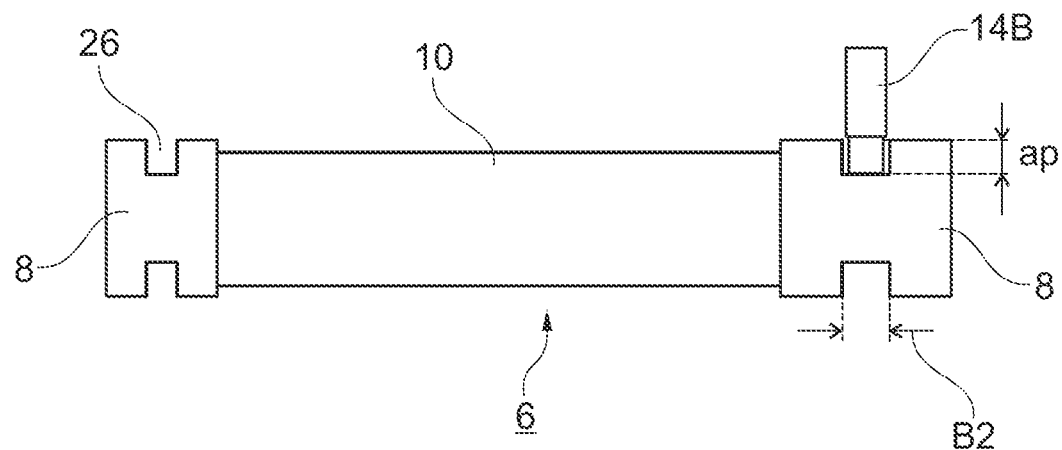
FIG. 4 shows a turbine blade in side view with blade roots arranged on both end sides, and an end milling cutter for milling in the retaining grooves.

As shown in FIG. 1, a blank 2 is clamped in a mount consisting of two retaining jaws 4A, 4B, in a machining station which is not represented here in further detail. The blank 2 is a monolithic, customarily parallelepipedal block consisting of a superalloy. The blank 2 serves for the production of a turbine blade 6, as is represented in FIG. 4 in a virtually finally machined state. At each of its two ends sides, the turbine blade 6 has a respective blade root 8, between which a blade body 10 extends. In the machined final state, the blade body 10 customarily has an aerofoil-like cross-sectional area. The turbine blade 6 and hence also the blank 2 extend in a longitudinal direction 12, as shown in FIG. 1.

In the case of the blank 2 in FIG. 1, two root regions 8' and a centrally arranged body region 10' are indicated. The two blade roots are machined out in the root region 8' in the course of milling and the blade body 10 is machined out in the body region 10'.

The turbine blade 6 has an overall length >50 cm up to 2 m. The blades here are thus turbine blades 6 which are used in large turbines, for example in power stations for generating power or else in large aircraft power plants. The width B of the blade body is typically in the region of approximately >10 cm.

Referring to FIG. 1, in a first method step, the blank 2 is first subjected to roughing machining. Here, a face milling cutter 14A is moved in an advancing direction 16 over a side to be machined of the blank 2. The face milling cutter 14A is in this case activated according to a trochoidal procedure whose movement sequence is illustrated in FIG. 3.

As can be seen herefrom, a circular movement is superimposed on the advancing movement in the advancing direction 16, with the overall result that a spiral movement which extends in the advancing direction 16 is obtained within a two-dimensional machining plane. The milling cutter 14A, 14B illustrated schematically in FIG. 3 here generally penetrates successively into the workpiece to be machined until a so-called radial feed depth ae is achieved. The gradual engagement results overall in a gentle machining. The radial feed depth corresponds to the distance between two successive spiral paths in the advancing direction 16. In the case of machining the body region 10' with the aid of the face milling cutter 14A, for example, the radial feed depth ae amounts to approximately 0.5 to 1.5 mm and is in particular in the region of approximately 1.0 mm.

Figure 3:
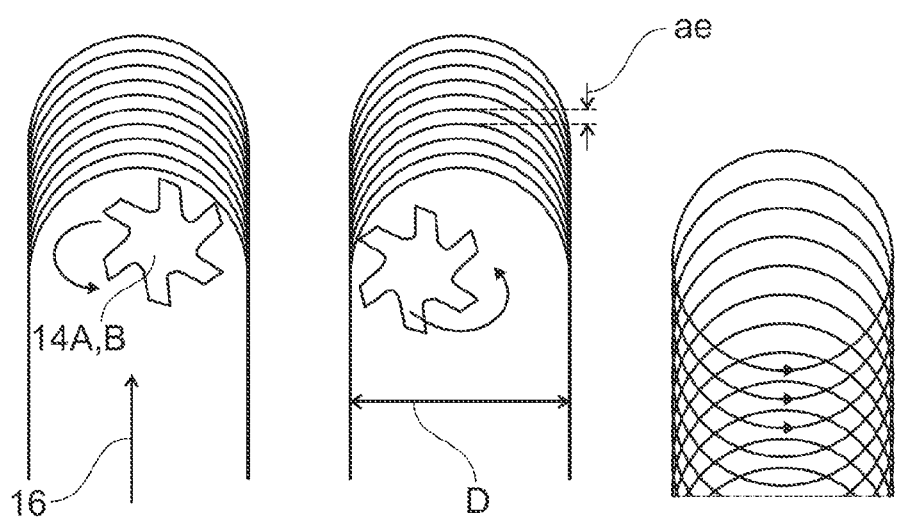
FIG. 3 shows a schematic illustration of the movement sequence of a milling cutter during trochoidal milling.

The trochoidal milling generates a milling path whose path width corresponds to the diameter d of the circular movement (FIG. 3).

Figure 2:
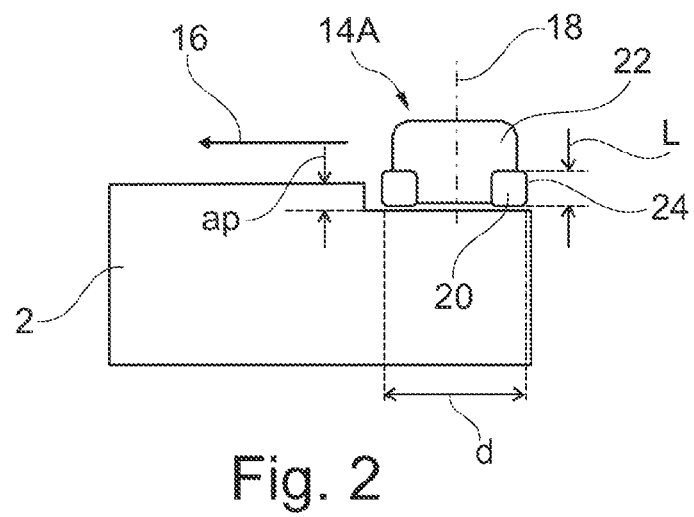
FIG. 2 shows an enlarged side detail view of the blank with face milling cutter.

In addition, the face milling cutter 14A is fed in in the direction of its milling cutter longitudinal axis 18 by an axial feed depth ap (FIG. 2). The axial feed depth ap therefore corresponds to the material depth to be removed from the blank 2.

As indicated in FIG. 1, the advancing direction 16 corresponds to the longitudinal direction 12. The face milling cutter 14A is moved from the right-hand root region 8' to the left-hand root region 8'. In this case, only one method step takes place for each side of the blank 2 to be machined. The path width, that is to say the circle diameter D, corresponds to the width B1 of the blank 2 and the material depth to be removed corresponds to the axial feed depth ap. This lies, for example, in the range between 3 and 8 mm, in particular in the region of approximately 5 mm. The diameter d of the face milling cutter 14A is comparatively smaller.

The face milling cutter 14A is a milling cutter equipped with indexable cutting inserts 20. The indexable cutting inserts 20 each have a respective active cutting edge 24 which is engaged with the blank 2. Here, the active cutting edge 24 is engaged over virtually its entire length L with the workpiece (blank 2). This means that the axial feed depth ap corresponds for example to 70% to 80% of the length of the cutting edge 24.

In the exemplary embodiment described here with the selected axial and radial feed depths, the advancement fz of the cutting edge 24 is preferably in the range of 0.3 to 0.4 mm. As cutting speed Vc, a speed in the range for example of 250 to 320 m/min is set.

A particularly efficient, time- and cost-saving as well as tool-protecting method is made available by the trochoidal milling of the body region 10' described herein. Of key significance here is the fact that the whole side of the blank 2 is formed by being passed over only once. By contrast with conventional roughing methods in which a successive, multiple feed is customarily required in the axial direction (axial feed depth), considerably quicker milling is thus made possible. Multiple milling paths are also required in conventional milling methods in order to machine the whole tool width. Tests have shown that, by comparison with a conventional milling method in which a milling cutter is moved only in the advancing direction 16 without superimposed circular movement, the entire machining time for the roughing machining can be virtually halved. In conventional milling methods, up to 6 milling steps are required in such a situation in order to achieve the desired axial depth of the material removal of for example 5 mm.

In addition, the service life of the indexable cutting inserts 20 used was considerably increased since they are now engaged over their virtual entire length, by contrast with the conventional method in which only a fraction of the cutting edge is loaded and must correspondingly apply a higher cutting performance, thereby leading to premature wear.

At the end of the roughing method, the blank 2 then machined further has an approximately parallelepipedal cross-sectional contour, preferably with a certain precontouring running in the direction of the aerofoil profile. Following the roughing machining, the blade body 10—in a manner not illustrated in further detail here—is milled to the end contour with the characteristic aerofoil profile.

Figure 5:
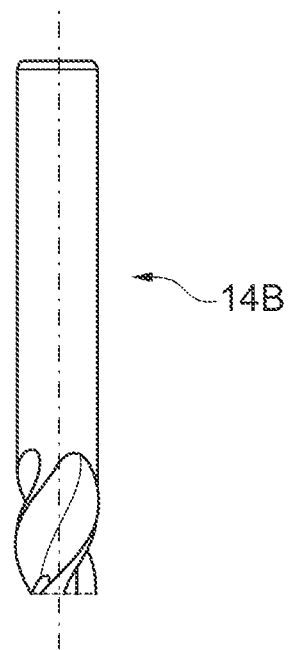
FIG. 5 shows a side view of an end milling cutter for milling the retaining grooves.

Finally, so-called retaining grooves 26 are also milled into the blade roots 8 as a further milling step. The turbine blades 6 are hooked via these retaining grooves 26 into corresponding carriers of the turbine and fastened there. The retaining grooves 26 are preferably machined with an end milling cutter 14B represented in FIG. 5. The trochoidal milling method is also used for incorporating the retaining grooves 26. The groove width B2 here corresponds to the path width of the milling path, that is to say the circle diameter D. The axial feed depth ap corresponds to the groove depth. The milling cutter 14B particularly used is a customary standard milling cutter with positive cutting geometry, in which thus the cutting edges are each formed at an acute angle in the manner of a wedge.

The entire milling of the blank 2, that is to say the roughing machining of the body region 10', the subsequent final machining to the aerofoil-shaped cross-sectional contour and in particular also the machining of the retaining grooves 26, takes place in particular on only one machining machine without any reclamping of the workpiece being carried out.

Overall, a very efficient, rapid and material-protecting method is achieved by the milling method described here. An essential aspect here is the use of the trochoidal milling method, in particular for the roughing machining of the body region 10'. The trochoidal method particularly also allows the possibility of selecting the longitudinal direction 12 as advancing direction 16, even in the case of the large turbine blades 6 described here with lengths of in some cases over a meter.

What is claimed is:

1. A method for milling a blank in the production of a turbine blade which in the final state has at least one blade root for fastening to a carrier and also an adjoining blade body extending in the longitudinal direction, the method comprising:
   clamping the blank on its root side in a mount; and
   machining the blank with a milling cutter, wherein machining the blank comprises moving the milling cutter in an advancing direction for roughing machining while superimposing a circular movement as per a trochoidal milling method,
   wherein a diameter of the milling cutter lies in the range of from about 40% to about 70% of a width to be machined of the blank.

2. The method of claim 1 wherein machining the blank comprises machining the blank in the region of the blade body.

3. The method of claim 1 wherein the advancing direction is the longitudinal direction of the blank.

4. The method of claim 1 wherein the turbine blade has a length greater than 40 cm.

5. The method of claim 1 wherein the turbine blade has a length greater than 50 cm.

6. The method of claim 1 wherein the turbine blade has a length in the range of from about 100 cm to about 200 cm.

7. A method for milling a blank in the production of a turbine blade which in the final state has at least one blade root for fastening to a carrier and also an adjoining blade body extending in the longitudinal direction, the method comprising:
   clamping the blank on its root side in a mount; and
   machining the blank with a milling cutter, wherein machining the blank comprises moving the milling cutter in an advancing direction for roughing machining while superimposing a circular movement as per a trochoidal milling method,
   wherein the blank is milled down to a predetermined size in only one step with the roughing machining; wherein the material depth to be removed corresponds to an axial cutting depth; and wherein the milling cutter has at least one cutting edge with a cutting edge length which is here engaged, in particular over a large part of its cutting edge length, with the blank being machined, and
   wherein more than 70% of the cutting edge length is engaged with the blank being machined.

8. The method of claim 7 wherein more than 80% of the cutting edge length is engaged with the blank being machined.

9. The method of claim 7 wherein the axial cutting depth is greater than 4 mm.

10. The method of claim 1 wherein a diameter of the superimposed circular movement corresponds to a width to be machined of the blank.

11. A method for milling a blank in the production of a turbine blade which in the final state has at least one blade root for fastening to a carrier and also an adjoining blade body extending in the longitudinal direction, the method comprising:
    clamping the blank on its root side in a mount; and
    machining the blank with a milling cutter, wherein machining the blank comprises moving the milling cutter in an advancing direction for roughing machining while superimposing a circular movement as per a trochoidal milling method, wherein the milling cutter used for machining in the region of the blade body is a face milling cutter equipped with cutting inserts.

12. The method of claim 1 wherein subsequent to the roughing machining, the blank is machined to the final contour by a milling method in the region of the blade body.

13. The method of claim 1 wherein retaining grooves are milled in the region of the blade root with the aid of the trochoidal milling method.

14. The method of claim 13 wherein the retaining grooves are milled using a conventional end milling cutter whose cutting edges have a positive cutting edge geometry.

15. The method of claim 1 wherein the entire milling in the production of the turbine blade takes place without reclamping the blank.

* * * * *